United States Patent Office 3,579,568
Patented May 18, 1971

3,579,568
SYNTHESIS OF CARBOXYLIC ACIDS FROM ETHYLENE AND CARBON MONOXIDE AND NOBLE METAL COMPOUNDS
Richard F. Heck, Wilmington, and Patrick M. Henry, McDaniel Crest, Del., assignors to Hercules Powder Company, Wilmington, Del.
No Drawing. Original application Aug. 18, 1965, Ser. No. 480,809. Divided and this application Jan. 16, 1969, Ser. No. 791,789
Int. Cl. C07c 67/04
U.S. Cl. 260—497
4 Claims

ABSTRACT OF THE DISCLOSURE

The disclosed process is a method for producing carboxylic acids by carbonylation of olefinic hydrocarbons. An olefin such as ethylene, and water or an acid such as acetic acid, are brought into contact with carbon monoxide in the presence of a compound of a Group VIII noble metal such as palladium at a temperature in the range of 25° to 250° C. Using ethylene and acetic acid as reactants, the product contains β-acetoxypropionic acid. A redox agent such as cupric chloride may be used to effect regeneration of the noble metal compound.

This application constitutes a division of our application for U.S. Letters Patent Ser. No. 480,809, filed Aug. 18, 1965, now abandoned.

This invention relates to the production of carboxylic acids and esters thereof, and more particularly to production of unsaturated aliphaaic acids and esters thereof and β-alkoxy aliphatic esters and β-acyloxy aliphatic acids.

It is known that olefins may be treated with carbon monoxide in the presence of aliphatic alcohols under the catalytic influence of catalysts containing platinum to produce aliphatic esters. In U.S. 2,876,254, for instance a mixture of carbon monoxide, ethylene and methanol are reacted in the presence of a catalyst which is an alcohol-soluble salt of tin or germanium and an alcohol-soluble salt of a Group VIII metal, and there is produced methyl propionate. The catalyst is a true catalyst in that it is used in less than stoichiometric amounts and the catalyst is not used up in the process.

It is known that ethylene reacts with palladium salts in the absence of other reagents to produce only an adduct of the ethylene and the palladium salt, but to produce betachloro propionyl chloride when carbon monoxide is added. It is also known that ethylene reacts with acetic acid in the presence of palladium salts to form vinyl acetate, and that ethylene reacts with alcohols in the presence of palladium salts to produce a 1,1-dialkoxyethylene.

It is an object of this invention to provide a new process for the preparation of carboxylic acids and esters from unsaturated hydrocarbons. It is a further object to provide a process for the production of unsaturated carboxylic acids from olefins. A still further object is to provide a process for the production of β-alkoxyaliphatic carboxylic acids and esters or β-acyloxyaliphatic carboxylic acids from which unsaturated carboxylic acids and esters may be produced by known reactions.

In accordance with the present invention, it has now been found that a carboxylic compound of the group consisting of compounds of the formulas:

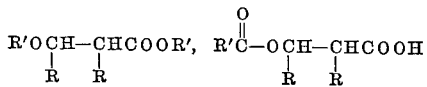

RCH=CRCOOR' and RCH=CRCOOH is produced by contacting and reacting, at a temperature in the range of 25 to 250° C. in the presence of a compound of a Group VIII noble metal, carbon monoxide with an unsaturated compound of the formula RCH=CHR and a reagent of the group consisting of an alcohol of the formula R'OH, an acid of the formula R'COOH, and water, in which compounds R is hydrogen, a monovalent hydrocarbon group or a divalent hydrocarbon group in which the two R groups are united to form a chain of 3 to 4 carbons which forms part of a ring with the carbons to which the R groups are attached, and R' is a $C_1$ to $C_8$ hydrocarbon group.

In the process of this invention the reaction of an unsaturated hydrocarbon, carbon monoxide and a palladium salt, in the presence of an alcohol, a carboxylic acid, or water, produces a chlorine-free acid product, which, in the case of an alcohol medium, is the ester of the alcohol and the corresponding β-alkoxy carboxylic acid having one more carbon in the carbon chain than the unsaturated hydrocarbon used, and, in the case of an aliphatic carboxylic acid medium is the β-acyloxy aliphatic acid having one more carbon than the unsaturated hydrocarbon used, and in the case of water is the β-hydroxycarboxylic acid, or an unsaturated carboxylic acid corresponding to the pyrolysis product of these acids.

Thus, it has been found that in the reaction of an olefin, RCH=CHR, with carbon monoxide in the presence of a Group VIII noble metal salt, there is produced at temperatures in the lower end of the reaction temperature range a carboxylic compound of the formula

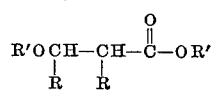

when an alcohol R'OH is present, a carboxylic compound of the formula

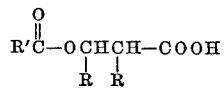

when a carboxylic acid is present or a carboxylic compound of the formula

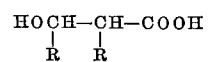

when water is present and there is produced at temperatures in the higher end of the reaction temperature range an unsaturated carboxylic acid of the formula

RCH=CRCOOH

The unsaturated hydrocarbons which enter into this reaction are those of the formula RCH=CHR where the R groups are the same or different and are hydrogen, or monovalent hydrocarbon groups, or, when the R groups are taken together to form a divalent hydrocarbon chain of 3 to 4 carbon atoms in the chain are divalent hydrocarbon groups. Ethylene is a very important olefin of the class in which both R groups are hydrogen. Propylene is an example of the olefin in which one R group is an aliphatic hydrocarbon group. Cis and trans butenes are examples of olefins in which both R groups are aliphatic hydrocarbon groups. Styrene is an example of an olefin in which an R group is phenyl. Cyclohexene, norbornylene, alpha pinene, beta pinene, bornylene, camphene and dicyclopentadiene are examples of unsaturated hydrocarbons in which both R groups taken together form a chain of 3 to 4 carbon atoms in a chain. In these cases, the two R groups taken together form a ring with the ethylenic carbon atoms of the unsaturated hydrocarbon as members of the ring.

The process of this invention is illustrated by the following examples.

EXAMPLE 1

A mixture of 250 ml. of 0.01 molar $Li_2PdCl_4$ in acetic acid, 67 grams cupric chloride, and 41 grams sodium acetate was placed in a titanium lined 500 ml. autoclave filled with ethylene to 900 p.s.i.g., and then with carbon monoxide to 2000 p.s.i.g., and heated at 140° C. for 4 hours. The reaction mixture was freed of inorganic materials and distilled to recover 3.6 grams β-acetoxypropionic acid.

EXAMPLE 2

A mixture of 250 ml. of 0.01 molar $Li_2PdCl_4$ in acetic acid, 33 grams lithium acetate, and 67 grams cupric chloride was placed in a titanium lined 500 ml. autoclave and filled with ethylene under 1000 p.s.i.g. and then with carbon monoxide under 2000 p.s.i.g. the reaction mixture was heated at 100° C. for 2 hours, and then was freed of inorganic materials and distilled to recover 9.23 g. β-acetoxypropionic acid.

EXAMPLE 3

A mixture of 250 ml. of 0.0065 molar palladium dichloride in methanol, 67 grams cupric chloride and 71 grams disodium hydrogen phosphate was placed in a 500 ml. titanium lined autoclave and ethylene was added under 900 p.s.i.g., followed by carbon monoxide under 2000 p.s.i.g. This mixture was heated at 80° C. for 4 hours and then analyzed by gas chromatography, which showed the presence of 100 millimoles (5 grams) of product rich in methyl β-methoxypropionate.

EXAMPLE 4

Example 1 was repeated with heating at 80° C. for 4 hours instead of 140° C. for 4 hours. The yield was 130 millimoles (17.1 grams) of β-acetoxypropionic acid.

EXAMPLE 5

A mixture of 250 ml. acetic acid, 67 grams cupric chloride, 41 grams sodium acetate and 3 grams chloroplatinic acid was placed in a platinum-lined 500 ml. autoclave, and carbon monoxide was added to give a pressure of 2000 p.s.i.g. Then ethylene was added to raise the total pressure to 3000 p.s.i.g. The reaction mixture was heated at 100° C. for 12 hours. The resulting reaction mixture was freed of inorganic material, and the organic material was distilled to recover 0.6 gram of beta-acetoxypropionic acid.

EXAMPLE 6

Example 5 was repeated using 1 gram platinous potassium chloride in place of chloroplatinic acid, and 6.32 grams beta-acetoxypropionic acid was recovered.

EXAMPLE 7

Example 5 was repeated using 2 grams hydrated ruthenium trichloride in place of chloroplatinic acid, and there was obtained 2.75 grams beta-acetoxypropionic acid.

EXAMPLE 8

Example 5 was repeated using 2 grams rhodium trichloride trihydrate in place of chloroplatinic acid and there was obtained 3.17 grams beta-acetoxypropionic acid.

EXAMPLE 9

A mixture of 250 ml. ethanol, 1 gram palladous chloride, 67 grams cupric chloride, and 41 grams sodium acetate was placed in a platinum-lined 500 ml. autoclave. Carbon monoxide was introduced to a pressure of 2000 p.s.i.g., and then ethylene was introduced to a pressure of 3000 p.s.i.g. The mixture was heated at 80° C. for 6 hours and the reaction mixture was shown by gas chromatography to contain 0.4 gram ethyl beta-ethoxypropionate as well as some diethyl carbonate, 1,1-diethoxyethane, and diethyl succinate.

EXAMPLE 10

A mixture of 200 ml. 0.01 molar $Li_2PdCl_4$ in acetic acid, 67 grams cupric chloride, 41 grams sodium acetate and 21 grams propylene at about 1000 p.s.i.g. in a 500 ml. autoclave. Carbon monoxide was then added to raise the pressure to 2000 p.s.i.g. The reaction mixture was heated at 80° C. for 6 hours. After freeing the organic from the inorganic materials 2 grams crotonic acid was recovered by distillation.

EXAMPLE 11

Example 10 was repeated using 28 grams cis-butene-2 in place of propylene and there was produced 3.5 grams of tiglic acid.

EXAMPLE 12

Example 10 was repeated using 28 grams trans-butene-2 in place of propylene and there was produced 0.5 gram of tiglic acid.

EXAMPLE 13

A mixture of 150 ml. methanol, 16.8 grams cupric chloride (anhydrous) and 200 mg. $PdCl_2$ was placed in a 1-liter Teflon-lined autoclave fitted with a stirrer. Carbon monoxide gas was then introduced to a pressure of 500 p.s.i.g. at 80° C. and then ethylene was introduced to a pressure of 600 p.s.i.g. Oxygen was then introduced to bring the pressure up to 650 p.s.i.g. After 1 hour the pressure had dropped to 450 p.s.i.g. Carbon monoxide was added to bring the pressure up to 550 p.s.ig. and ethylene was added to bring the pressure up to 650 p.s.i.g., and oxygen was added to bring the pressure up to 700 p.s.i.g. One half hour later and also one hour later this introduction of carbon monoxide, ethylene, and oxygen was repeated, the pressure increments being 100, 100 and 50 as before and the highest pressure being 925 p.s.i.g. After 2 hours final heating at about 82–83° the process was terminated. The highest temperature during the reaction was about 90° C. The product analyzed as follows:

| | Percent |
|---|---|
| Acetaldehyde | 21 |
| 1,1-dimethoxyethane | 8 |
| Methyl propionate | 10 |
| Methyl acrylate | 0.5 |
| Methyl β-methoxypropionate | 44 |
| Dimethyl succinate | 2 |

EXAMPLE 14

A mixture of 150 ml. methanol, 16.8 grams cupric chloride (anhydrous), 15.8 grams lithium acetate, and 200 mg. palladium chloride was placed in a Teflon-lined 1-liter autoclave fitted with a stirrer. Carbon monoxide was added to a pressure of 500 p.s.i.g. at 135° C., and then ethylene was added to a pressure of 700 p.s.i.g. and finally oxygen was added to 750 p.s.i.g. The temperature quickly rose to 175° C. and it was lowered to 144°–150° for 2 hours. Repressuring was repeated three times, increments of 200 p.s.i.g. each of ethylene and carbon monoxide and 100 p.s.i.g. of oxygen being added each time. The temperature rose to 168° C. after the last repressuring. The product analyzed as follows:

| | Percent |
|---|---|
| Acetaldehyde | 7 |
| Dimethoxyethane | 22 |
| Methyl propionate | 3 |
| Methyl acrylate | 45 |
| Dimethyl carbonate | 8 |
| Methyl betamethoxypropionate | 6 |
| Dimethyl succinate | 3 |

The process is carried out at a total pressure of at least about 1 atm., and preferably at a pressure of at least about 500 p.s.i.g. The yield is improved with pressure, and pressures in the range of 500 to 2000 p.s.i.g. are quite satisfactory. Pressures as high as 20,000 may be used without reduction in yield. The course of the reaction may followed by change of pressure in a closed vessel.

The process is also carried out at a temperature in the range of about 25 to 250° C. depending on the product desired and the reagents used. The unsaturated products are obtained in greater yield than the alkoxy and acyloxy products when the temperature is above the optimum for preparing the alkoxy and acyloxy products which are referred to as the saturated products.

The saturated products of this invention are susceptible to thermal decomposition by loss of R'O— or

group as the corresponding alcohol or acid thereby producing the coresponding unsaturated acid or ester. Thus acrylic acid and methyl acrylate are formed readily in this manner from acetoxypropionic acid and methyl methoxypropionate respectively. Within the temperature range of this process such thermal decomposition may be a side reaction of the process even at the lowest suitable temperature, and at higher temperatures, this side reaction becomes the predominant reaction. Accordingly, it is within the scope of this invention to also produce as products the unsaturated products of the general formulas

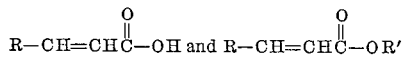

The temperature at which the unsaturated product is produced is variable with the olefin. The unsaturated product is obtained from propylene and from the butenes at a lower temperature than from ethylene as will be seen from the examples.

The process of this invention can be carried out in an inert solvent such as acetonitrile, nitromethane, dioxane, diethyl ether, dimethyl formamide and the like. The process can also be carried out in the absence of a solvent other than an excess of the alcohol or acid used in the process.

The reaction vessel used in the process should be resistant to the corrosivity of the reaction. Linings of titanium, platinum, tantalum, or silver are particularly useful for this purpose. Glass or ceramic linings may also be used. Plastic linings such as Teflon, a polytetrafluoroethylene resin, and Penton, bis(chloromethyl)oxetane polymer, are quite satisfactory.

The ratio of unsaturated hydrocarbon to carbon monoxide is not critical and may be variable over a range as wide as 10:1 to 1:10. However, it is preferable to use a ratio nearer 1:2. The gases may be added separately or may be mixed before adding.

The alcohol used in the reaction of this invention for the production of alkoxy esters is an aliphatic alcohol such as methanol, ethanol, propanol, butanol, hexanol, and octanol. The alcohol having 1–6 carbon atoms is preferred. The primary alcohols give best results in the process, especially with the higher alcohols. Methanol and ethanol are perferred.

The acid used in the reaction of this invention for the production of the acylated hydroxy acid is an aliphatic acid such as formic acid, acetic acid, propionic acid, butyirc acid, valeric acid, hexanoic acid, octanoic acid. The acids having 1–6 carbon atoms are preferred. The straight chain acids give the best results. Acetic acid is preferred.

The amount of alcohol required for the reaction is the amount necessary for production of the alkoxy ester, namely, 2 moles per mole of olefin which reacts. Even when an inert solvent is used, it is preferable to provide an excess alcohol and recover the excess. When no inert solvent is used, an excess of alcohol sufficient to dissolve the reagents is used.

The amount of carboxylic acid required for the reaction to produce an acyloxy acid is one mole per mole of olefin. An excess is preferred even when an inert solvent is used and the excess acid will aid in solubilizing the reagents.

The metal reagent is a Group VIII noble metal salt or chelate, such as the chloride, bromide, acetate, propionate, acetylacetonate, acetoacetate, or complex salts with alkali or alkaline earth metals. The complex salt of palladium chloride and lithium chloride is particularly suitable. The catalyst may be a mixed salt of palladium and other noble metals, such as Ru, Rh, Ir, Os, and Pt. However, salts of metals which promote side reactions should be absent. Salts of Groups I–A and II–A may be present and lithium chloride is prefererd because of its solubilizing effect.

In the process of this invention halide and sulfate ions are suppressed by the additional presence in the reaction system of a salt of an alkali or alkaline earth, such as a salt of a weak acid, examples of which are a carboxylic acid, boric acid, or phosphoric acid. Examples of such salts are sodium acetate, lithium acetaet, calcium acetate, sodium borate and disodium phosphate. It is preferable to add a metal salt of a carboxylic acid such as an alkali meatl salt to aid the reaction in this respect.

The palladium salt used in the process of this invention is reduced in valence in the course of the reaction and must be regenerated either by its removal and regeneration outside the system, or by its regeneration during the course of the reaction. The regeneration may be accomplished electrolytically or chemically and it is quite desirably accomplished by the use of a redox system. The examples illustrate the chemical regeneration in situ using $CuCl_2$. Further regeneration of such a system may be accomplished by passing air or oxygen into the system, either in situ or outside the system. In a system in which the palladium metal is regenerated, the palladium metal can be introduced into the system as the metal and converted in situ into the salt.

What we claim and desire to protect by Letters Patent is:

1. The process of producing carboxylic acids which comprises contacting ethylene, carbon monoxide and acetic acid at a temperature in the range of 25° to 250° C. in the absence of mineral acid and oxygen but in the presence of a divalent palladium simple salt or an inorganic complex of said salt with an alkali metal salt.

2. The process of claim 1 wherein the divalent palladium salt is palladium dichloride.

3. The process of claim 1 wherein the divalent palladium salt is lithium palladium chloride, $Li_2PdCl_4$.

4. The process of claim 3 wherein cupric chloride also is present.

References Cited
UNITED STATES PATENTS

| | | | |
|---|---|---|---|
| 3,381,030 | 4/1968 | Biale et al. | 260—497 |
| 3,346,625 | 10/1967 | Fenton et al. | 260—497 |
| 3,349,119 | 10/1967 | Fenton et al. | 260—497 |
| 3,437,676 | 4/1969 | Kutepow et al. | 260—468 |

LORRAINE A. WEINBERGER, Primary Examiner

V. GARNER, Assistant Examiner

U.Sl. Cl. X.R.

260—410.5, 410,9, 463, 468, 476, 484, 485, 486, 514, 515, 533, 604, 615

PO-1050
(5/69)

UNITED STATES PATENT OFFICE
CERTIFICATE OF CORRECTION

Patent No. 3,579,568　　　　　　　　　Dated　May 18, 1971

Inventor(s) R. F. HECK & P. M. HENRY

It is certified that error appears in the above-identified patent and that said Letters Patent are hereby corrected as shown below:

Col. 1, line 53 of printed patent, "1, 1-dialkoxyethylene" should read --1, 1-dialkoxyethane--

Signed and sealed this 14th day of September 1971.

(SEAL)
Attest:

EDWARD M. FLETCHER, JR.　　　　　ROBERT GOTTSCHALK
Attesting Officer　　　　　　　　Acting Commissioner of Patents